United States Patent [19]
Fauth

[11] 3,810,219
[45] May 7, 1974

[54] FILM TRANSPORTING MECHANISM FOR STILL CAMERAS

[75] Inventor: Guenter Fauth, Unterhaching, Germany

[73] Assignee: AGFA-Gevaert Aktiengesellschaft, Leverkusen, Germany

[22] Filed: Dec. 11, 1972

[21] Appl. No.: 314,277

[30] Foreign Application Priority Data
Dec. 9, 1971 Germany.......................... 2161078

[52] U.S. Cl.............. 354/206, 95/31 AC, 95/31 FL
[51] Int. Cl....................... G03b 1/62, G03b 19/04
[58] Field of Search ......... 95/31 FM, 31 AC, 31 FL

[56] References Cited
UNITED STATES PATENTS

| 2,307,748 | 1/1943 | Philips............................. 95/31 AC |
| 3,595,149 | 7/1971 | Fujimoto.......................... 95/31 AC |
| 3,641,897 | 2/1972 | Fujimoto.......................... 95/31 FL |
| 3,682,066 | 8/1972 | Simon.............................. 95/31 FM |

*Primary Examiner*—Robert P. Greiner
*Attorney, Agent, or Firm*—Michael S. Striker

[57] ABSTRACT

A film transporting mechanism for use in still cameras wherein a lever or wheel constitutes the input member of a planetary transmission. The sun gear or planet carrier of the transmission is held against rotation by a film scanning device during a first stage of rotation of the input member from its starting position to a fixed end position and while the input member rotates a spur gear or an internal gear by way of one or more planet pinions whereby the spur gear or internal gear rotates the takeup reel in a direction to collect the film. When the transport of film by the length of a frame is completed, the scanning device releases the sun gear or the planet carrier and arrests the spur gear or internal gear to thus terminate the transport of film while the input member continues to rotate toward its fixed end position and drives the sun gear or planet carrier. This enables the input member or a part which derives motion therefrom to perform one or more additional functions, such as the indexing of a multiple flash lamp holder and/or the cocking of a shutter or impeller, subsequent to completion of film transport by the length of a frame. The extent of movement of the input member from its starting to its fixed end position is independent of the angle through which the takeup reel must be rotated in order to advance the film by the length of a frame.

15 Claims, 6 Drawing Figures

3,810,219

FILM TRANSPORTING MECHANISM FOR STILL CAMERAS

BACKGROUND OF THE INVENTION

The present invention relates to photographic apparatus, and more particularly to improvements in film transporting mechanisms for roll film. Still more particularly, the invention relates to improvements in manually operated film transporting mechanisms which can be utilized with advantage in still cameras to advance the film by the length of a frame between successive exposures of film to scene light.

It is already known to provide a still camera with a film transporting mechanism employing a rapid-transport lever or wheel which must be pivoted or rotated through about 180° in order to advance the film by the length of a frame. It is also known to construct such cameras with a view to insure that the rapid-transport lever or wheel can perform one or more additional functions, for example, the cocking of a shutter, the indexing of a multiple flash lamp holder and/or the cocking or stressing of an impeller for percussion type flash lamps. The lever is coupled to a spring which returns it to a starting position upon completion of film transport. The extent to which the film is to be transported in response to pivoting of the lever or in response to rotation of the wheel is normally determined by a scanning device which engages the film and enters one of a series of perforations when a fresh film frame registers with the picture taking lens of the camera. The film can be provided with one perforation for each film frame. It is also known to use a scanning device in the form of a sprocket wheel which is driven by the film and rotates through 360° in response to transport of the foremost unexposed film frame into register with the picture taking lens.

A drawback of such film transporting mechanisms is that the extent of angular displacement of the lever or wheel changes (decreases) from actuation to actuation because the diameter of the roll of exposed film on the takeup reel grows with the number of completed exposures, i.e., the angle through which the takeup reel turns in order to collect successive film frames decreases proportionally with increasing number of exposed film frames to thus necessitate decreasing angular displacements of the rapid-transport lever or wheel. This creates problems when the lever or wheel must perform one or more additional functions because all such functions must be started and terminated during the initial stage of angular movement of the rapid-transport lever or wheel. Consequently, the angular displacement of the lever or wheel from its starting position necessitates the exertion of a substantial force because the lever or wheel must rotate the takeup reel, index a lamp holder, cock the shutter and/or displace a spring-biased impeller practically immediately after it leaves its starting position. Moreover, the camera must be provided with complex couplings, clutches or analogous expensive devices which enable the lever or wheel to move relative to a cocked shutter or impeller or relative to an indexed lamp holder when the lever or wheel must still perform a relatively large angular movement in order to complete the transport of the film by the length of a frame, i.e., before the takeup reel accumulates a relatively large roll of exposed film. Also, the user is likely to break or damage the film transporting and/or other camera mechanism when the transport of film by the length of a frame is completed in response to a relatively small angular displacement of the lever or wheel because the user (especially an inexperienced person) is likely to assume that the transport of film is not completed unless the lever or wheel is always turned through a predetermined maximum angle such as is necessary only when the takeup reel has collected a relatively small number of exposed film frames.

SUMMARY OF THE INVENTION

An object of the invention is to provide a photographic apparatus with a novel and improved film transporting mechanism wherein the input member (such as a pivotable lever or a rotary wheel) can always move through a fixed distance for the transport of film by the length of a frame, irrespective of the number of exposed film frames on the takeup reel.

Another object of the invention is to provide a film transporting mechanism whose input member can be moved with the exertion of a relatively small force, even if the input member must perform or initiate one or more additional functions, such as the cocking of a shutter or impeller, the indexing of a lamp holder and/or others.

A further object of the invention is to provide a photographic apparatus with a versatile film transporting mechanism which can perform one or more additional functions but still occupies little room and consists of a relatively small number of simple parts.

An additional object of the invention is to provide a film transporting mechanism whose input member can be moved beyond the position which is necessary to complete the transport of photographic film by the length of a frame so that the input member can perform or initiate one or more additional functions subsequent to completion of the film transporting operation.

Another object of the invention is to provide a novel film transporting mechanism which can be built into existing types of photographic apparatus irrespective of whether such apparatus employ photographic film having a single perforation for each film frame or one or more rows of perforations in customary distribution of several perforations for each film frame.

The invention is embodied in a photographic apparatus for use with roll film which is collected by a rotary takeup member during forward transport to place successive film frames into a position for exposure to scene light. More particularly, the invention resides in the provision of a film transporting mechanism which can be used in such types of photographic apparatus and comprises transmission means (preferably a planetary transmission) including input means (such as a pivotable lever or a rotary wheel) which is movable from a fixed starting position to a fixed end position and output means (e.g., an internal gear or a spur gear of the planetary transmission) which receives motion from the input means to rotate the takeup member during one (preferably first) stage of movement of the input means from its starting position toward its fixed end position, and arresting means which is arranged to effect a termination of movement of the output means in response to completion of film transport by the length of a frame so that the input means is then free to move relative to the output means and takeup member during another (preferably the remaining) stage of its movement from the starting position to the end position. This enables the input means (or a part which moves therewith) to perform one or more additional functions (such as the indexing of a multiple flash lamp holder, the cocking of shutter means and/or the stressing of an impeller for percussion type flash lamps) during that stage of its movement when the takeup member is at a standstill.

In accordance with a more specific feature of the invention, the arresting means comprises a scanning device which tracks the film and includes or actuates a locking portion movable from a first to a second position in response to completed film transport by the length of a frame whereby the locking portion prevents further movement of the output means and thus arrests the film at the exact moment when the foremost unexposed film frame is in register with the picture taking lens. The transmission means may further comprise second output means (such as the sun gear or the planet carrier of a planetary transmission) which is blocked in the first position and is released for movement with the input means in the second position of the locking portion.

It will be noted, that contrary to the construction and mode of operation of presently known film transporting mechanisms, the improved film transporting mechanism allows the input means to move after the transport of photographic film by the length of a frame is already completed. This insures that the functions which the input means is to perform or initiate need not be started and/or completed during that stage of movement of the input means when the latter causes the takeup member to collect exposed film. Instead, such functions are invariably carried out during preselected portions of movement of the input means to its end position, either prior to or after, or partly prior to and partly after, completion of film transport by the length of a frame.

The novel features which are considered as characteristic of the invention are set forth in particular in the appended claims. The improved film transporting mechanism itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
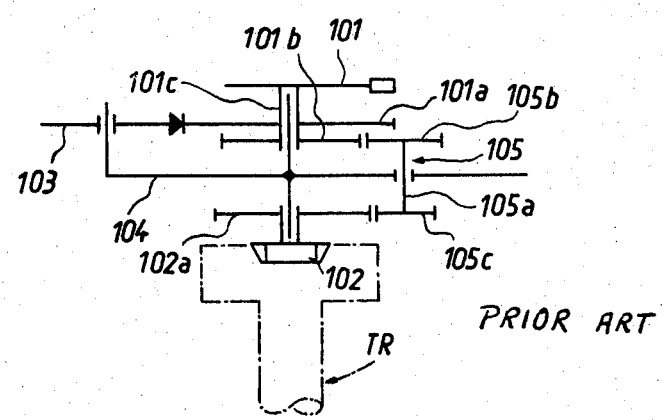
FIG. 1 is a diagrammatic view of a conventional film transporting mechanism.

Referring first to FIG. 1, there is shown a conventional film transporting mechanism which is assumed to be installed in and on the housing or body 104 of a still camera. The film transporting mechanism comprises a rotary input member 101 (e.g., a rapid-transport lever or wheel) which is accessible at the outer side of the housing 104 and is mounted on a hollow shaft 101c which carries a ratchet wheel 101a forming part of means for arresting the input member 101 in response to progressively decreasing angular displacements from a fixed starting position. The film transporting mechanism further comprises a coupling element 102 which normally engages a takeup reel TR in the housing 104 and is indirectly rotated by the input member 101 through the intermediary of a transmission which allows the input member 101 to rotate (until arrested by the ratchet wheel 101a in cooperation with a locking pawl 103) after the coupling element 102 has been rotated through an angle which is necessary to complete the transport of photographic film through a distance corresponding to the length of a frame.

The transmission includes a spur gear 101b which is rigid with the shaft 101c and meshes with a gear cluster 105 which further meshes with a spur gear 102a rigid with the coupling element 102. The shaft 105a of the gear cluster 105 is journalled in the housing 104. This gear cluster further comprises coaxial pinions 105b, 105c which respectively mesh with the spur gears 101b and 102a.

The locking pawl 103 constitutes or is actuated by a conventional scanning device or feeler (not shown) or by a conventional sprocket wheel (not shown). The scanning device is used if the camera employs film having a single perforation for each film frame. When the input member 101 is rotated by hand to rotate the takeup reel TR by way of the coupling element 102, the scanning device enters an oncoming perforation of the film and causes the locking pawl 103 to arrest the ratchet wheel 101a (and hence the input member 101). The angular displacement of the input member 101 from its starting position to a position in which the locking pawl 103 engages the ratchet wheel 101a decreases as the diameter of convoluted film on the takeup reel TR increases. Consequently, of the input member 101 is to index a multiple flash lamp holder and/or to cock a shutter or an impeller, it must perform such function or functions during the initial stage of its rotation, i.e., before the locking pawl 103 arrests the sprocket wheel 101a, even at a time when the transport of film takes place while the major part of film is already convoluted on the takeup reel TR.

The situation is analogous if the locking pawl 103 is controlled by a sprocket wheel which completes a full revolution in response to completed transport of film by the length of a frame. The sprocket wheel is used if the film is provided with one or two rows of closely adjacent perforations, i.e., with two or more perforations for each film frame.

Figure 2:
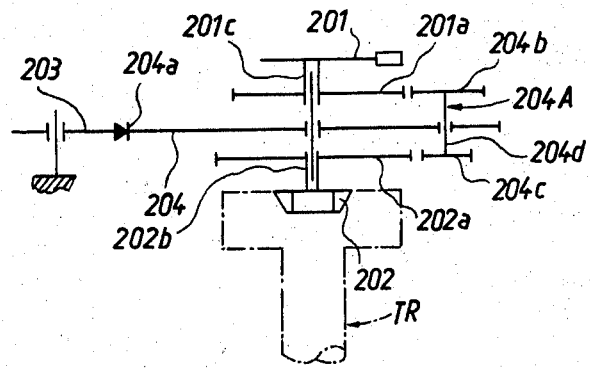
FIG. 2 is a diagrammatic view of a film transporting mechanism which embodies one form of the invention.

FIG. 2 shows a film transporting mechanism wherein the input member 201 (a lever or wheel) of a planetary transmission can be rotated through a predetermined angle regardless of the diameter of convoluted exposed film on the takeup reel TR. The shaft 201c of the input member 201 is rigid with a sun gear 201a which meshes with the outer pinion 204b of a gear cluster 204A further including a shaft 204d and an inner pinion 204c in mesh with a first output member or spur gear 202a on the shaft 202b of a coupling element 202 which rotates the takeup reel TR. The shaft 204d is rotatable in a second output member or planet carrier 204 which constitutes or carries a ratchet wheel having an annulus of teeth 204a one of which is engaged by a locking pawl 203 during transport of the film by the length of a frame. The locking pawl 203 forms part of an arresting unit for the planet carrier 204. This arresting unit further comprises a scanning device or feeler, e.g., a lever which tracks photographic film of the type having one perforation for each film frame or a sprocket wheel which completes a full revolution in response to transport of the film by the length of a frame. The planet carrier 204 is set in motion upon completed transport of film by the length of a frame and can serve as a means for indexing a flash lamp holder and/or for cocking a shutter or an impeller while the film is at a standstill. Thus, and in contrast to heretofore known film transporting mechanisms, the input member 201 completes a first stage of its movement through a fixed distance during transport of the film and a second stage of movement through such fixed distance subsequent to completed transport of film. The sum of the distances which are covered by the input member 201 during the two stages is constant but their ratio changes with increasing diameter of convoluted exposed film on the takeup reel TR.

When the locking pawl 203 arrests the planet carrier 204 because the transport of photographic film by the length of a frame is completed, the aforementioned feeler or sprocket wheel holds the film (and hence the spur gear 202a) against further rotation while the input member 201 rotates the sun gear 201a and thus causes the planet pinion 204c to roll along the spur gear 202a until the input member reaches a fixed stop (not shown). A spring (not shown) thereupon returns the input member 201 to its starting position while a conventional blocking device (not shown) holds the parts 202a, 202, TR against rotation in a direction to pay out the film.

The gear cluster 204A, the planet carrier 204, and the gear 202a constitute a reducing gearing with a high step-down ratio so that the takeup reel TR can be held against further rotation with a minimal force as soon as the locking pawl 203 becomes disengaged from the planet carrier 204.

Figure 3:
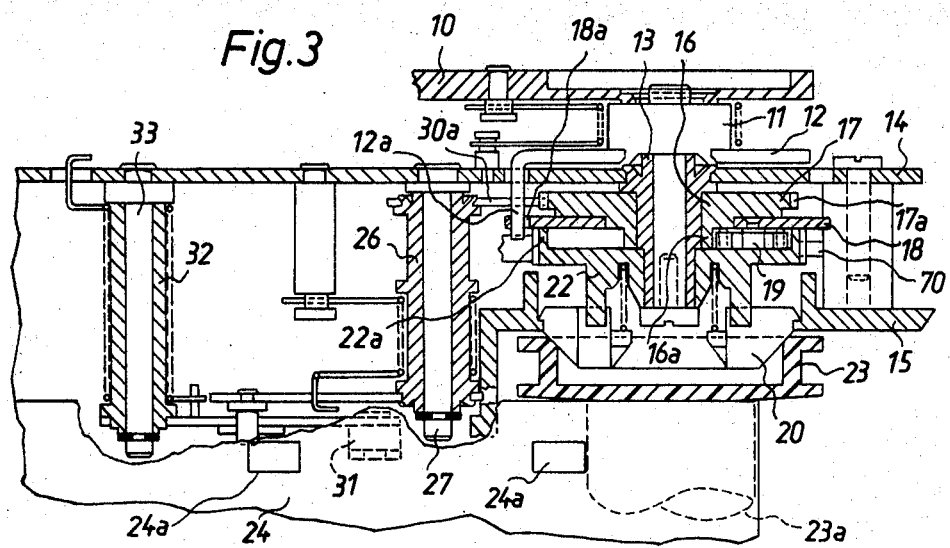
FIG. 3 is a fragmentary vertical sectional view of a still camera which embodies a modified film transporting mechanism.
Figure 4:
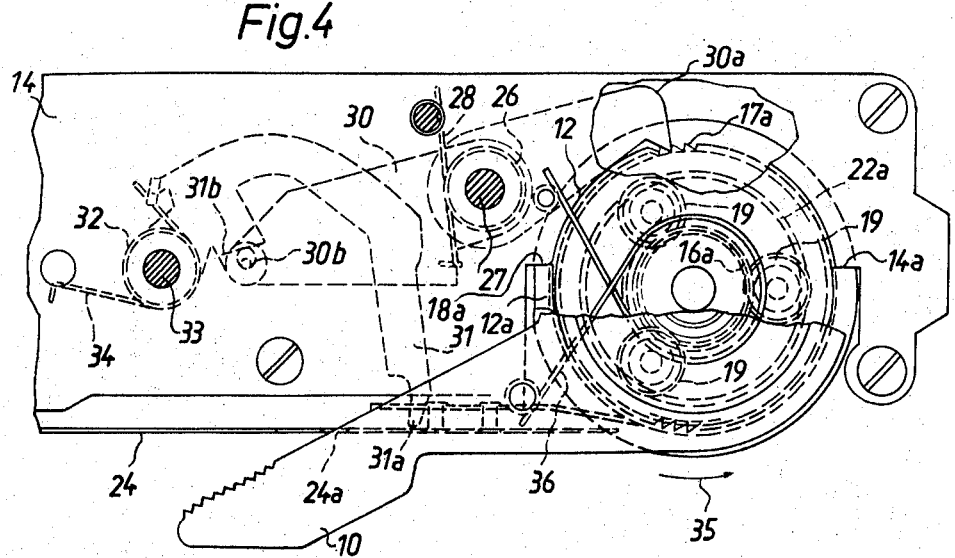
FIG. 4 is a plan view of the structure shown in FIG. 3 with a portion of the input means broken away.

FIG. 3 and 4 illustrate in greater detail a film transporting mechanism which is similar to that shown in FIG. 2. The input member of the planetary transmission is a rapid-transport lever 10 which corresponds to the input member 201 of FIG. 2 and is pivotable by hand to thereby rotate a shaft 11 which is rigid with a driving disk 12. The shaft 11 is rotatable in a sleeve 13 which is riveted to a wall 14 forming part of or separably attached to the camera body 15. The sleeve 13 is surrounded by an output member or sun gear 16 having a ratchet wheel 17 provided with an annulus of teeth 17a. The sun gear 16 is further provided with an annulus of gear teeth 16a and is surrounded by a planet carrier 18 which supports the shafts of three equidistant planet pinions 19 whose teeth mesh with the gear teeth 16a of the sun gear 16. The planet pinions 19 can rotate a torque transmitting output member or internal gear 22 which rotates a coupling element 20 for the takeup reel 23. The film 24 which is to be convoluted onto the core 23a of the takeup reel 23 in response to pivoting of the input member 10 from the starting position shown in FIG. 4 has a row of perforations 24a, one for each film frame.

The arresting unit of the film transporting mechanism comprises a locking lever having portions or arms 30, 30a which are riveted to a sleeve 26. The latter is rotatable on a fixed shaft 27 and is biased by a relatively weak torsion spring 28 so that the pallet of the locking portion or arm 30a normally engages one of the teeth 17a on the ratchet wheel 17 of the sun gear 16. A film scanning device or feeler 31 of the arresting unit is riveted to a sleeve 32 which is rotatable on a fixed shaft 33 and is biased by a relatively strong torsion spring 34 so that a projection or follower 31a of the feeler 31 engages the film 24 in line with the row of perforations 24a.

The operation is as follows:

In order to transport the film 24 by the length of a frame, the user pivots the input member 10 in the direction indicated by arrow 35 (FIG. 4) whereby the input member stresses a torsion spring 36 which tends to return it to the starting position of FIG. 4. The planet carrier 18 has an arcuate slot 18a for an inwardly bent entraining arm 12a of the disk 12 which rotates with the shaft 11 in response to pivoting of the input member 10. The teeth of planet pinions 19 on the carrier 18 mesh with the teeth 22a of the torque transmitting output member or internal gear 22 which drives the coupling element 20 and thus rotates the takeup reel 23 in a direction to collect the film 24. The locking portion 30a engages the adjacent teeth 17a on the ratchet wheel 17 of the sun gear 16 so that the latter is held against rotation. This enables the planet pinions 19 to roll along the gear teeth 16a and to rotate the internal gear 22 with the coupling element 23 and takeup reel 24.

When an oncoming perforation 24a reaches the follower 31a of the scanning device 31, the latter is pivoted by the relatively strong spring 34 in a clockwise direction, as viewed in FIG. 4, whereby a cam face 31b on the scanning device 31 displaces a roller follower 30b on the locking portion 30 which pivots about the axis of the shaft 27 to disengage the locking portion 30a from the ratchet teeth 17a in immediate response to completed transport of the film 24 by the length of a frame. The sun gear 16 is then free to rotate in response to pivoting of the input member 10 whereby the planet pinions 19 roll along the internal gear 22 which is at a standstill due to friction of film 24 in the film channel and the blocking action of the follower 31a in the adjacent perforation 24a.

It will be noted that, in contrast to the construction shown in FIG. 2, the first output member of the planetary transmission is an internal gear 22 (rather than a spur gear 202a) and that the second output member is a sun gear 16 (rather than a planet carrier 204). In the first position shown in FIG. 4, the locking portion 30a holds the sun gear 16 against rotation during the initial stage of pivotal movement of the input member 10 from the starting position of FIG. 4 while the arresting unit 30, 30a, 31, 31a allows the internal gear 22 to rotate. When the locking portion 30a assumes its second position in response to penetration of the follower 31a into the oncoming perforation 24a, the sun gear 16 is free to rotate but the arresting unit 30, 30a, 31, 31a prevents further rotation of the invention gear 22.

An important advantage of the film transporting mechanism of FIGS. 3 and 4 is that, when the transport of film 24 by the length of a frame is completed, i.e., when the follower 31a penetrates into the oncoming perforation 24a, the input member 10 can continue to pivot in the direction of arrow 35 while the internal gear 22 is at a standstill and the released sun gear 16 rotates about the axis of the shaft 11. The pivotal movement of the input member 10 is always terminated in a predetermined end position when the entraining portion 12a of the disk 12 engages a fixed stop 14a of the wall 14.

The additional functions of the film transporting mechanism can be performed at any desired stage or stages of pivotal movement of the input member 10 from the starting position of FIG. 4, through that intermediate position in which the follower 31a enters the oncoming perforation 24a, and to the fixed end position in which the entraining portion 12a reaches the stop 14a. Such additional function or functions (e.g., the indexing of a multiple flash lamp holder, the cocking of shutter, the stressing or cocking of an impeller for percussion type flash lamps and/or others) can be performed by the input member 10, by the disk 12 or by the sun gear 16 (after the latter has been disengaged from the locking portion 30a). The shutter or the impeller is actuated in response to operation of the customary camera release means which also withdraws the follower 31a from the adjacent perforation 24a so that the input member 10 can be pivoted again to advance the film 24 by the length of a frame and to perform or initiate one or more additional functions.

During pivoting of the input member 10 by the torsion spring 36, the planet carrier 18 rotates with the shaft 11 and disk 12, and the planet pinions 19 drive the sun gear 16 because the camera is provided with customary blocking means (e.g., a pawl 70) which prevents the internal gear 22 and coupling element 20 from rotating in a direction to cause the takeup reel 23 to pay out the film 24. The teeth 17a on the ratchet wheel 17 of the rotating sun gear 16 thereby travel along the pallet of the locking portion 30a which is disengaged from the sun gear 16 because the follower 31a extends into the adjacent film perforation 24a. This completes the film transporting operation and the camera is ready to make an exposure in response to operation of the release means (not shown) which actuates the shutter and withdraws the follower 31a so that the locking portion 30a reengages the adjacent teeth 17a. Consequently, the sun gear 16 is again held against rotation during that (initial) stage of renewed pivoting of the input member 10 which is required to advance the film 24 by the length of a frame. It will be noted that the extent of movement of the input member 20 from the starting position of FIG. 4 is not affected by the diameter of exposed film 24 on the core 23a of the takeup reel 23. This is due to the fact that, in contrast to the operation of presently known film transporting mechanisms, the penetration of follower 31a into an oncoming perforation 24a results in establishment of a driving connection between a previously arrested output member (sun gear 16) and the moving input member 10. The extent of pivotal movement of the input member 10 is selected in such a way that the penetration of follower 31a into the oncoming perforation 24a invariably takes place before (or not later than when) the entraining portion 12a engages the stop 14a, even when the major part of film 24 is still stored on the supply reel (not shown).

Figure 5:
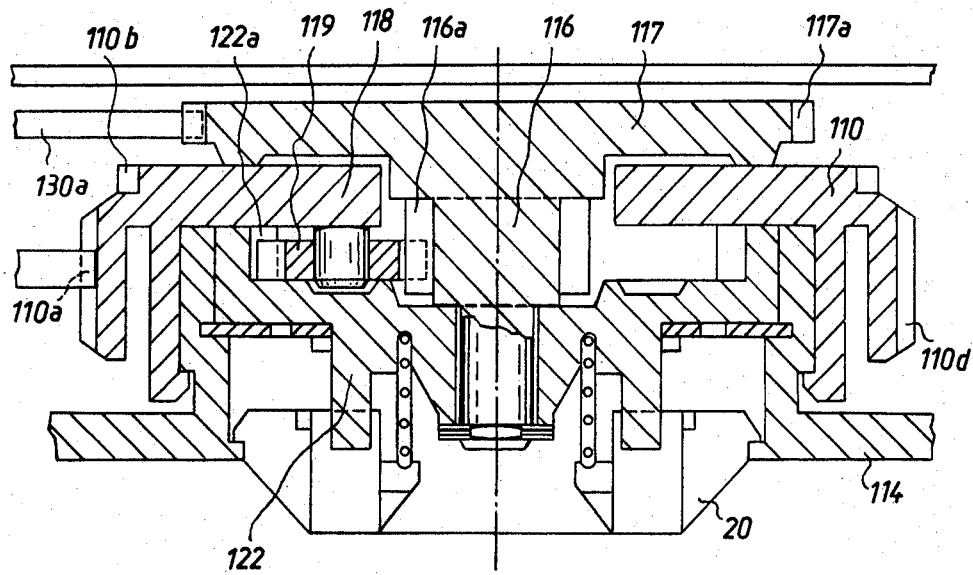
FIG. 5 is a fragmentary vertical sectional view of a still camera which embodies a third film transporting mechanism.

FIG. 5 illustrates a portion of a modified film transporting mechanism wherein the input member 110 of the planetary transmission is a wheel or disk a portion of which extends from the camera body or housing 115, for example, at a corner of the housing so that it can be readily engaged and rotated by one or more fingers. A portion 118 of the input member 110 constitutes a planet carrier for one or more planet pinions 119 which mate with an output member in the form of an internal gear 122 acting as a torque transmitting means for the coupling element 20. The reference character 110a denotes a blocking pawl which engages the teeth 110d of the input member 110 so that the latter can rotate in a single direction, namely, to cause the takeup reel (not shown) which is engaged by the coupling element 20 to collect the film.

Each planet pinion 119 further meshes with a second output member here shown as a sun gear 116 having an annulus of gear teeth 116a and a ratchet wheel 117 with teeth 117a corresponding to teeth 17a of FIGS. 3-4 and cooperating with a locking portion 130a corresponding to the locking portion 30a of the arresting unit 30, 30a, 31, 31a shown in FIG. 4. The locking portion 130a holds the sun gear 116 against rotation during forward transport of the film by the length of a frame but is disengaged from the ratchet wheel 117 as soon as the follower of the scanning device (not shown) which controls the locking portion 130a enters an oncoming film perforation. The input member 110 continues to rotate whereby the planet pinions 119 begin to roll along the teeth 122a of the arrested internal gear 122 and rotate the sun gear 116 which can carry out one or more functions, such as cocking of the shutter or an impeller, indexing of a flash lamp holder and/or others. Alternatively, the input member 110 can be provided with an annulus of teeth 110b which drive a gear train (not shown) serving to cock the shutter and/or to perform additional functions during or subsequent to completed transport of the film by the length of a frame.

Figure 6:
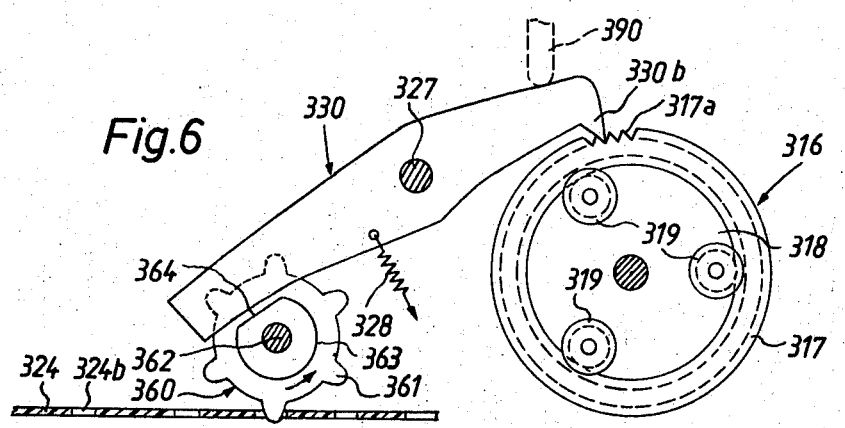
FIG. 6 is a fragmentary plan view of a fourth film transporting mechanism.

FIG. 6 illustrates a portion of a further film transporting mechanism. The sun gear 316 has a ratchet wheel 317 which is engaged by the pallet 330b of the two-armed locking lever 330. The latter is biased in a counterclockwise direction by a helical spring 328 which tends to move the pallet 330b away from the teeth 317a of the ratchet wheel 317. The shaft 327 for the locking lever 330 is mounted in the camera body.

The scanning device or feeler of the camera shown in FIG. 6 is a sprocket wheel 360 which engages a conventional film 324 having one or two marginal rows of perforations 324b for the teeth 361 of the sprocket wheel 360. The shaft 362 of the sprocket wheel 360 carries a disk-shaped cam 363 having a flat 364. The periphery of the cam 363 is normally tracked by the left-hand arm of the locking lever 330.

The transport of film 324 by the length of a frame is completed when the film 324 has caused the sprocket wheel 360 to rotate through 360° (in a counterclockwise direction, as viewed in FIG. 6). The spring 328 then causes the left-hand arm of the locking lever 330 to engage the flat 364 whereby the lever 330 pivots anticlockwise and disengages it pallet 330b from the ratchet wheel 317. The planet pinions 319 are then free to rotate the sun gear 316 in the same way as described in connection with FIGS. 3-4. The resistance of film 324 to forward transport is sufficient to hold the internal fear (not shown in FIG. 6) against rotation as soon as the lever 330 is disengaged from the ratchet wheel 317, i.e., as soon as the sun gear 316 is not positively held against rotation in response to rotation of the planet carrier 318 with the input member (not shown).

When the user of the camera operates the release means upon completed transport of the film 324 by the length of a frame, a displacing element 390 (indicated by broken lines) is caused to pivot the locking lever 330 in clockwise so as to reengage the pallet 330b with the ratchet wheel 317. This lifts the left-hand arm of the locking lever 330 off the flat 364 (against the opposition of the spring 328) whereby the lever 330 again holds the sun gear 316 against rotation. Renewed pivoting or rotation of the input member then results in forward movement of the film 324 so that the flat 364 travels about the axis of the shaft 362 and the left-hand arm of the locking lever 330 is engaged by the circular portion of the peripheral surface on the cam 363. The displacing member 390 can be returned to its idle or retracted position by the rotating sprocket wheel 360 or by the input member so that it does not oppose the pivotal movement of locking lever 330 under the action of the spring 328 when the transport of film 324 by the length of a frame is completed.

Otherwise the operation of the film transporting mechanism shown in FIG. 6 corresponds to that of the mechanism which is illustrated in FIGS. 3-4.

All embodiments of the present invention share the feature that the locking means which is actuated in response to completion of film transport by the length of a frame does not directly engage the input member (or a component which is rigid with the input member) but rather a component which forms part of a differential gearing and is allowed to move in response to continuing movement of the input member following the completion of film transport by the length of a frame. In other words, whereas the locking means 103 of the conventional film transporting mechanism shown in FIG. 1 directly engages and arrests a component 101a which is rigid with the input member 101 as soon as the transport of film by the length of a frame is completed, the locking means (330, 203, 30a or 130a) of the improved film transporting mechanism allows the input member (201, 10 or 110) to continue its movement upon completion of film transport by the length of a frame. Consequently, the input member of the improved film transporting mechanism can always move through a predetermined distance which allows for more satisfactory distribution of those stages of movement of the input member when the latter performs (or causes one or more components which receive motion therefrom to perform) one or more additional functions. For example, the completion of film transport can be followed by the indexing of a lamp holder, and such indexing can be followed by the cocking of the shutter or an impeller. This insures that the input member can be moved with the exertion of a relatively small effort in contrast to conventional film transporting mechanisms wherein all functions must be performed and completed during actual transport of roll film and during the initial stage of pivoting or rotation of the input member through a maximum angle.

Another advantage of the film transporting mechanism of FIGS. 3 and 4 is that the input member (or a component which is driven thereby) can produce a readily detectable signal if the input member has been released before reaching its end position. Referring again to FIGS. 3 and 4, and assuming that the operator failed to pivot the input member 10 through such an angle that the follower 31a was free to enter the oncoming perforation 24a, the input member 10 is pivoted clockwise (as viewed in FIG. 4) by the torsion spring 36 and causes the planet pinions 19 to rotate the sun gear 16 in a clockwise direction whereby the pallet of the locking portion 30a rides over the ratchet teeth 17a and produces a readily detectable noise which indicates to the operator that the transport of film 24 has not been completed. The planet pinions 19 must rotate the sun gear 16 because the internal gear 22 is held against rotation by the blocking pawl 70 which prevents the parts 20 and 22 from rotating in a direction to cause the takeup reel 23 to pay out the film 24.

The improved film transporting mechanism is susceptible of many additional modifications without departing from the spirit of the invention. For example, the one-piece sun gear 16 of FIG. 3 can be made of synthetic plastic (rather than metallic) material and may be assembled of several separately produced portions (e.g., a sun gear proper having the gear teeth 16a which mesh with the teeth of the planet pinions 19, and a ratchet wheel 17 with teeth 17a). Also, the input member 10 can be made integral with the shaft 11 and/or disk 12.

Still further, the mechanism of FIGS. 3 and 4 can be modified to more closely resemble the mechanism of FIG. 2. Thus, each planet pinion 19 can be replaced with a gear cluster 204A one pinion (204b) of which meshes with the sun gear 16 and the other pinion (204c) of which meshes with the internal gear 22. An advantage of the film transporting mechanism of FIG. 2 is that it need not employ an internal gear (see the gear 22 of FIGS. 3-4) because the pinions 204c of the gear clusters 204A can mesh with a simple spur gear. On the other hand, the planetary of FIGS. 3-4 employs a smaller number of planet pinions.

The planetaries of FIGS. 2, 3-4, 5 and 6 can be replaced by a transmission which uses a system of levers or cams, as long as the transmission allows the input member to move relative to an arrested output member of the transmission during actual transport of film and with the released output member of the transmission upon completion of film transport by the length of a frame. Still further, the arrangement may be such that the input member performs one or more additional functions during a first stage and transports the film during a next-following stage of its movement from the starting position.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a photographic apparatus for use with roll film which is collected by a rotary takeup member during forward transport to place successive film frames into a position for exposure to scene light, a combination comprising transmission means including input means movable from a starting position to an end position, first output means receiving motion from said input means to rotate the takeup member during a first stage of movement of said input means to said end position, and second output means receiving motion from said input means during a second stage of movement of said input means to said end position, one of said stages preceding the other of said stages; first arresting means arranged to effect a termination of movement of said first output means in response to completion of film transport by the length of a frame so that said input means is free to move relative to said first output means during said second stage of movement to said end position; and second arresting means for holding said second output means against movement during said first stage of movement of said input means.

2. A combination as defined in claim 1, wherein said first arresting means comprises a scanning device which is arranged to track the film and said second arresting means comprises a locking portion which is moved by said scanning device in response to completed film transport by the length of the frame from a first position in which said locking portion blocks said second output means to a second position in which said locking portion permits said second output means to move in response to movement of said input means.

3. A combination as defined in claim 1, wherein said first stage precedes said second stage of movement of said input means to said end position so that the movement of said first output means precedes the movement of said second output means in response to movement of said input means from said starting to said end position thereof.

4. A combination as defined in claim 2, wherein said second output means comprises a toothed rotary member and said locking portion engages with the teeth of said toothed rotary member during said first stage of movement of said input means.

5. A combination as defined in claim 2, wherein the film is provided with a row of perforations, one for each film frame, and said scanning device comprises follower means arranged to track the film during said first stage of movement of said input means and to enter an oncoming perforation of the film to thus complete said first stage and to simultaneously effect the movement of said locking portion from said first to said second position.

6. A combination as defined in claim 2, wherein said locking portion is movable relative to said scanning device and comprises follower means tracking said scanning device, said scanning device comprising means for moving said locking portion from said first to said second position in response to completed transport of film by the length of a frame.

7. A combination as defined in claim 6, wherein said first arresting means further comprises first biasing means for urging said scanning device into engagement with the film and said second arresting means further comprises second biasing means for urging said locking portion toward engagement with said second output means.

8. A combination as defined in claim 2, wherein said first biasing means comprises a first resilient element which biases said scanning device against the film with a relatively large first force and said second biasing means comprises a second resilient element which urges said locking portion toward engagement with said second output means with a relatively small second force.

9. A combination as defined in claim 1, wherein said first and second output means are rotatable relative to each other and said transmission means further comprises a step-down gearing interposed between said output means to enable said first arresting means to hold said first output means against rotation with said second output means with a relatively small force.

10. A combination as defined in claim 1, wherein said transmission means is a planetary transmission and said output means are coaxial gears, said transmission means further comprising at least one planet pinion mating with said gears and a planet carrier for said pinion.

11. A combination as defined in claim 10, wherein said second output means is the sun gear of said planetary transmission and comprises a ratchet wheel which is engaged by said locking portion in the first position of said locking portion.

12. A combination as defined in claim 10, wherein said second output means is said planet carrier.

13. A combination as defined in claim 10, wherein said planetary transmission includes a gear cluster having a first pinion mating with one of said coaxial gears and a second pinion mating with the other of said coaxial gears.

14. A combination as defined in claim 1, further comprising coupling means interposed between said first output means and the takeup member.

15. A combination as defined in claim 10, wherein said planet carrier is rigid with said input means.

* * * * *